Dec. 26, 1944.  C. J. GRIFFITH  2,365,755
MAST SPRAY RIG
Filed Jan. 2, 1943  4 Sheets-Sheet 1
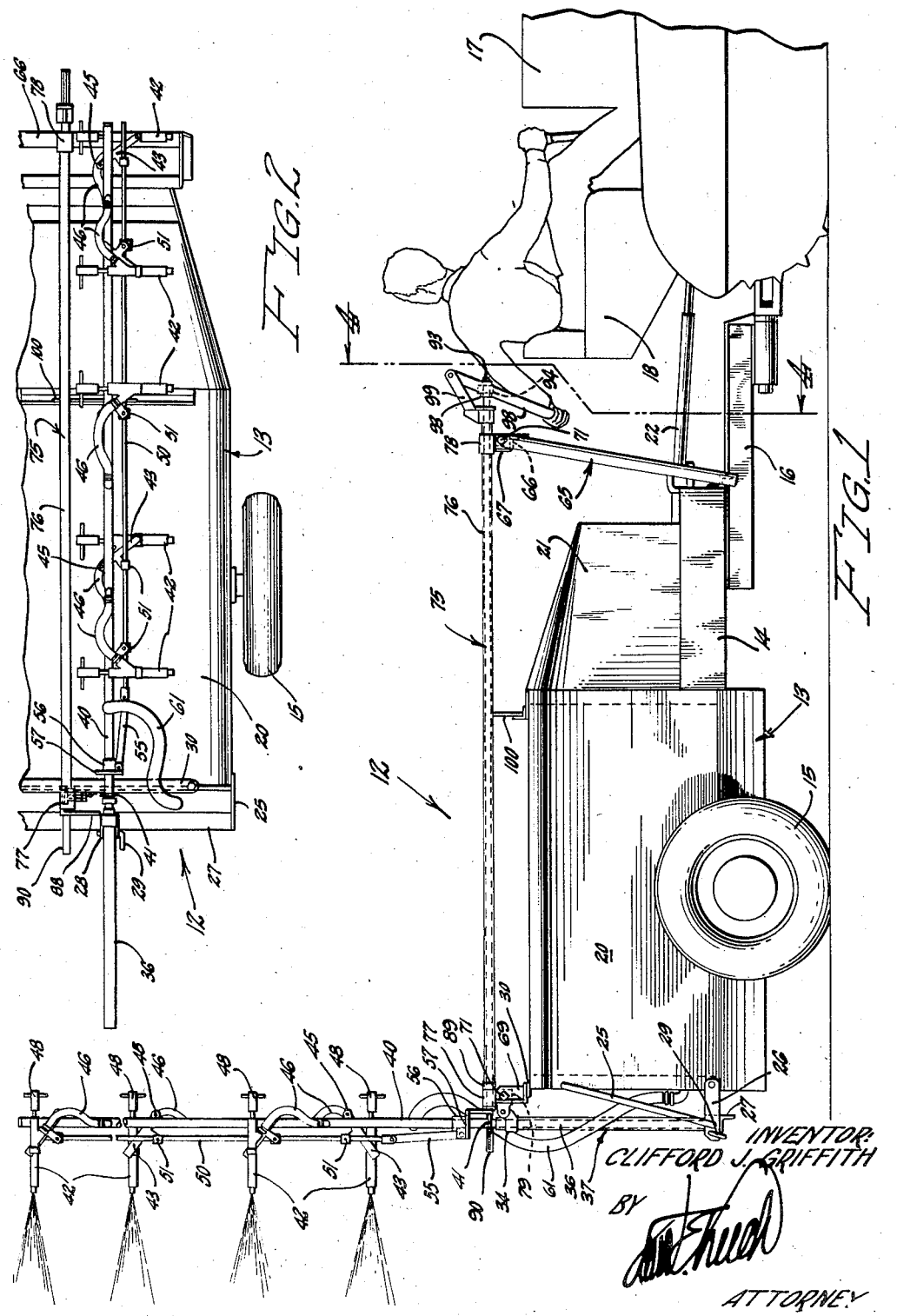

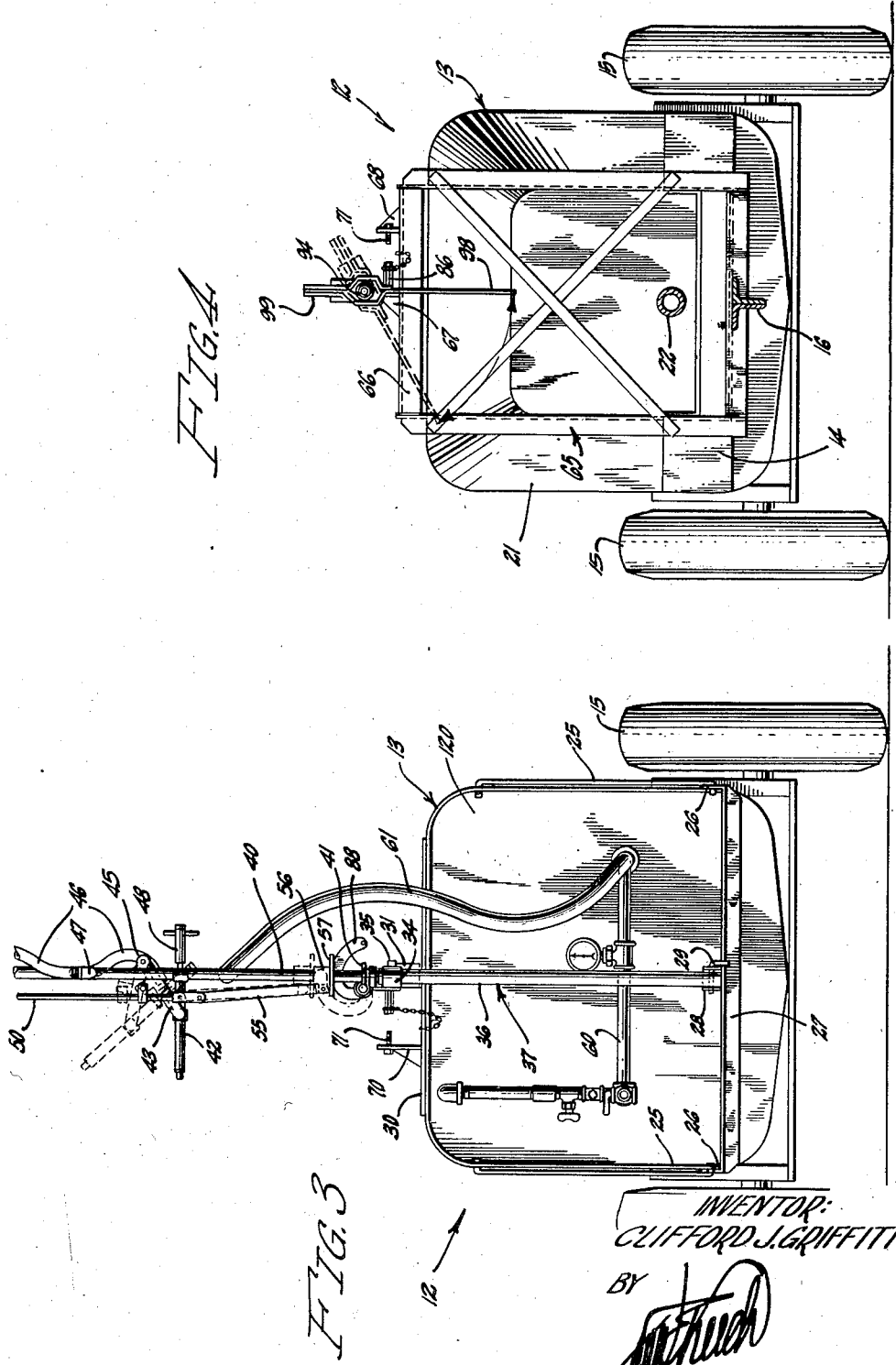

Dec. 26, 1944.    C. J. GRIFFITH    2,365,755
MAST SPRAY RIG
Filed Jan. 2, 1943    4 Sheets-Sheet 3
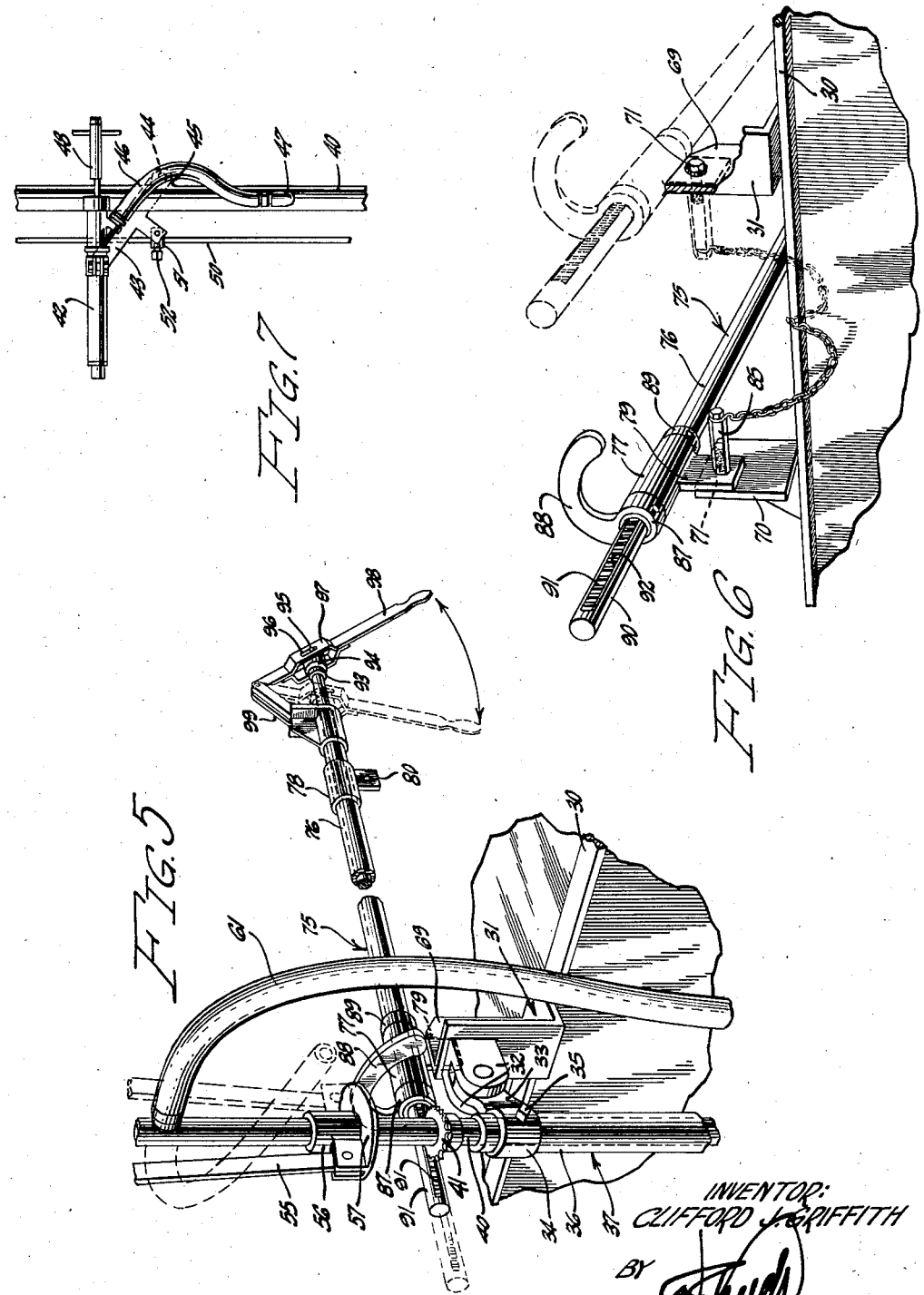

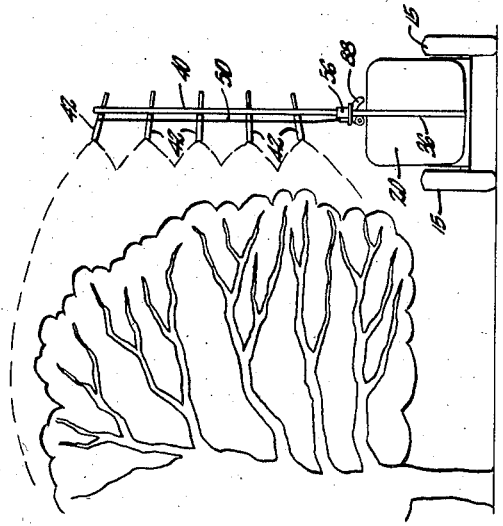
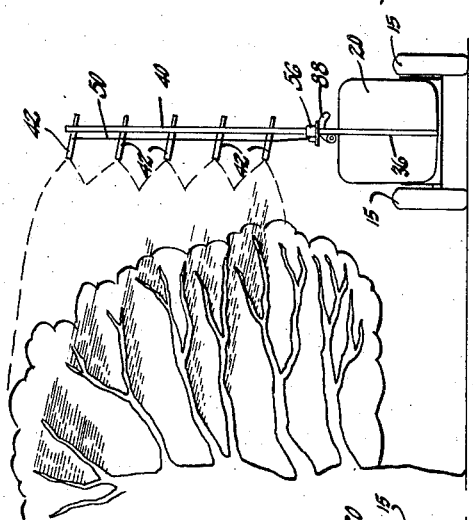
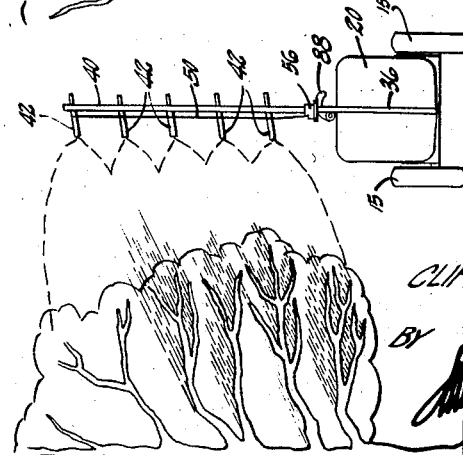

Patented Dec. 26, 1944

2,365,755

UNITED STATES PATENT OFFICE 2,365,755

MAST SPRAY RIG

Clifford J. Griffith, Dimondale, Mich., assignor to Food Machinery Corporation, San Jose, Calif., a corporation of Delaware Application January 2, 1943, Serial No. 471,185

2 Claims. (Cl. 299—73)

This invention relates to mast spray rigs, and particularly to such rigs as are adaptable for use in horticultural spraying.

Included among the objects of my invention are the object of providing a spray rig by which spray can be directed from a plurality of nozzles spaced vertically at a succession of different levels above the rig, and in which the directions said nozzles are pointed as to both vertical and horizontal angles are controllable by the operator of the tractor drawing the rig; of providing such a rig in which the nozzles are mounted on an upright standpipe or mast having means by which the standpipe can be readily lowered by an operator into a reclining position on the rig when the rig is not in operation and when traveling; and to provide such a rig which may be economically manufactured, which will require slight attention for upkeep, and will have a long operating life.

The manner of accomplishing the foregoing objects, as well as further objects and advantages, will be made manifest in the following description taken in connection with the accompanying drawings, in which:

Fig. 1 is a side elevational view of a preferred embodiment of the invention. This view shows the invention incorporated in a trailer which is hitched to a tractor, shows the standpipe in an upright position, and illustrates the manner in which the spray rig may be controlled by the operator of the tractor.

Fig. 2 is a fragmentary plan view of the trailer shown in Fig. 1, with the standpipe thereof in reclining position.

Fig. 3 is an enlarged fragmentary rear elevational view of Fig. 1, showing the nozzles turned laterally of the trailer.

Fig. 4 is an enlarged front elevational view of the trailer shown in Fig. 1, and taken on the line 4—4 thereof.

Fig. 5 is an enlarged fragmentary perspective view of the control mechanism of the invention.

Fig. 6 is a diagrammatic perspective view illustrating in broken and full lines the operative and inoperative positions respectively, of the control means of the invention.

Fig. 7 is a fragmentary detailed view illustrating the manner in which nozzles of the invention are mounted on the standpipe thereof.

Figs. 8, 9 and 10 are diagrammatic views illustrating the operation of my invention in horticultural spraying.

Fig. 8 shows the spray rig of my invention with the nozzles inclined downwardly to cause the spray to penetrate deep into the tree along the lines of the branches.

Fig. 9 shows the nozzles of my spray rig inclined upwardly uniformly to cause the spray delivered therefrom to uniformly reach the under surfaces of the leaves engaged thereby.

Fig. 10 shows the nozzles of my spray rig adjusted at varying angles to give a maximum spread to the spray delivered therefrom.

Referring specifically to the drawings, the preferred embodiment of the invention disclosed therein comprises a spray rig 12, which includes a trailer 13 having a frame 14 mounted on wheels 15, and having a tongue or hitch 16, by which the trailer is hitched to a tractor 17 for the purpose of operating the rig 12. The tractor 17 has a seat 18 in which the operator may sit while operating both the tractor and the spray rig, as shown in Fig. 1.

Provided on the frame 14 is a tank 20 and a housed pump 21, the latter being actuated by power delivered thereto from the motor of the tractor 17 through a shaft 22, for a purpose to be made clear hereinafter. Fixed on the rear end of the tank 20 and supported by rods 25 are a pair of arms 26 united at their outer ends by an angle iron 27. Provided centrally on the angle iron 27 is a socket 28 which opens rearwardly and has a pin 29 for closing the rear opening in this socket when desired.

The upper rear edge of the tank 20 is reinforced by a metal strap 30, which is preferably welded thereto and has mounted centrally thereon a bracket 31 having rearward extending ears 32 between which is pivotally mounted a tongue 33 of a collar 34. Fixed in the collar 34 as by a set screw 35, is a bearing tube 36 of a standpipe means 37. The lower end of the bearing tube 36 is adapted to swing into place in the socket 28 and be trapped therein by the pin 29 when the standpipe means 37 is rotated about its pivotal connection with the ears 32, to bring this means into the upright position in which it is shown in Figs. 1, 3 and 5.

Rotatably mounted in the bearing tube 36 is a standpipe 40, having fixed thereon a sprocket 41 which is disposed just above the upper end of the tube 36, and a plurality of nozzles 42 having frames 43 which are pivoted as at 44 to ears 45 provided as by welding on the standpipe 40 (see Fig. 7). The nozzles 42 may be any suitable spray nozzle such as commonly used for horticultural spraying, and is connected by a flexible hose 46 to an angle fitting 47 on the standpipe 40 to permit supplying this nozzle with spraying liquid from the standpipe. Each nozzle is capable of being adjusted by a handle 48 for controlling the character of spray delivered from the nozzle. The vertical angles at which the nozzles 42 deliver their spray is adapted to be controlled through a rod 50 having collars 51 adjustably fixed thereon by set screws 52, each of these collars being pivotally connected to one of the nozzle supporting brackets 43.

The lower end of the rod 50 is connected by a link 55 to a collar 56 slidably provided on the standpipe 40 a short distance above the sprocket 41, this collar having a cam responsive disc 57. Upper and lower ends of the standpipe 40 are closed, and spray liquid from the tank 20 is supplied to the standpipe under forced feed by the pump 21 through a pipe 60 and a flexible hose 61.

Provided on the trailer frame 14 just behind the operator's seat 18, is a forward control mechanism support 65, including an upper horizontal member 66 on which is mounted brackets 67 and 68. Bracket 67 is in fore and aft alignment with a flange bracket 69 provided on the bracket 31, whereas the bracket 68 is in fore and aft alignment with a bracket 70 provided on the reinforcing strap 30. Each of the brackets 67, 68, 69 and 70 has a machine screw 71 permanently fixed therein to extend horizontally from a face thereof as shown in Figs. 3, 4 and 6.

Disposed longitudinally over the trailer 13 is a control mechanism 75 including an outer tube 76, which is rotatably mounted in bearings 77 and 78, these bearings having downwardly extending lugs 79 and 80 respectively, these lugs being adapted to be secured on a pair of the machine screws 71 by a pair of relatively long nuts 85 and 86, so as to support the control means 75 either on the brackets 67 and 69 or the brackets 68 and 70. The rear end of the tube 76 has fixed thereto a collar 87 having provided thereon an involute cam 88. Cooperating with the collar 87 to prevent longitudinal movement btween the tube 76 and the bearing 77, is a collar 89 fixed to this tube on the opposite side of the bearing 77.

When the control mechanism 75 is mounted as aforesaid, on the brackets 67 and 69 it is in operative position for controlling the operation of the rig 12. The control means is shown in this position in dotted lines in Fig. 6. When this means is mounted on brackets 68 and 70 as shown in full lines in Figs. 2 and 6, it is in inoperative position, for the purpose of permitting the standpipe means 37 to be folded into reclining position, as shown in Fig. 2 and as will be described hereinafter.

When the control mechanism 75 is in operative position, the cam 88 is disposed as shown in Fig. 1 just under the edge of the cam responsive disc 57, so that rotation of the tube 76 shifts this disc and the collar 56 on which it is mounted vertically on the standpipe 40.

Slidably disposed inside the tube 76 is a smaller metal tube 90, having secured therein a chain 91 to provide a rack, access to which is had through a slot 92 formed in the tube 90 opposite a portion of the chain 91. When the control means 75 is in operative position, as aforesaid, the teeth of the sprocket 41 extend through the slot 92 into meshing relation with the chain rack 91, so that longitudinal movement of the tube 90 rotates the sprocket 41 and the standpipe 40.

Rotatably trapped on the forward end of the tube 90 by a pair of collars 93 fixed to said tube, is a collar 94 having pins 95 which extend into slots 96 of a yoke 97 provided in a lever 98, the upper end of which is pivotally mounted on an arm 99, which is fixed on the forward end of the tube 76. As clearly shown in Fig. 5, pushing and pulling on the lever 98 to shift this between full and dotted line positions shown therein, shifts the rear end of the tube 90 between its full and dotted line positions in this view, thereby rotating the standpipe 40. Swinging the lever 98 about the axis of the tube 90, however, has no effect on the latter but rotates the tube 76 and shifts the collar 56 vertically on the standpipe 40. Rotation of the tube 90 is prevented by the extension of the teeth of the sprocket 41 into the slot 92 in the rear end of the tube 90.

*Operation*

With the standpipe means disposed in an upright position and the control mechanism 75 in operative position, and with the tank 20 containing a suitable supply of spray liquid, the spray rig 12 is ready to be hooked up as shown in Fig. 1 to a tractor 17, and operated to deliver spray onto the foliage of trees as illustrated in Figs. 8, 9 and 10. While the nozzles 42 are shown turned rearwardly in Fig. 1, this is merely for the purpose of better showing the structure, as these nozzles are normally turned laterally to spray a row of trees as the spray rig 12 moves past these. During this travel by the spray rig, the operator of the tractor 18 manipulates the lever 98 so as to modify the angles at which the nozzles 42 direct their spray in any way that he may choose. For instance, he may set these nozzles as shown in Fig. 8, and then he may change these angles to those shown in Fig. 9, this being done by rocking the lever 98 slightly about the axis of the tube 76. On the other hand, he may wish to turn the nozzles forwardly or rearwardly to direct the spray at different surfaces of the foliage exposed to the spray arriving at these different angles, and this can be done by shifting the lever 98 in a fore and aft direction.

The situation diagrammatically shown in Fig. 10, in which the spray nozzles 42 are non-parallel, is accomplished by the individual loosening of the set screws 52 in the collars 51 and shifting these collars on the rod 50 so as to independently vary the setting of each nozzle 42 from that of the others. This mode of adjusting the set of the nozzles 42 is not frequently necessary, and means is therefore not required for accomplishing this while the rig is in motion.

When preparing the rig for storage or for traveling with it on the highway, the control mechanism 75 is transferred to its inoperative position, as shown in Fig. 2 and in full lines in Fig. 6, the pin 29 is removed to release the lower end of the standpipe means 36, and the latter is swung about its pivotal connection to the bracket 31 into reclining position, as shown in Fig. 2.

Provided on the forward end of the tank 20, for aiding in the support of the control means 75 and the standpipe means 37, when the latter is in a reclining position, is a rest 100. When thus lowered into reclining position for storage or traveling, the standpipe means 37 is secured by any suitable means to the rest 100 and members 66.

While it is preferable that the standpipe means 37 of my invention be employed as a conduit for delivering liquid to the several nozzles 42 mounted thereon, it is to be understood that it is possible to use other means to deliver liquid to said nozzles while employing the standpipe means 37 primarily as a mast for supporting the nozzles 42 and controlling their attitudes.

It is also to be noted that while my invention is primarily designed for horticultural spraying operations, it is not necessarily limited to this use, but may be employed by suitable adaptation for delivering liquid in solid streams from one or more nozzles mounted on the mast thereof, and the attitude of the nozzle or nozzles be manually controlled by the novel control mechanism of the invention.

What is claimed is:

1. In combination: a base; a mast rotatable thereon in upright position; a nozzle mounted on said mast for angular adjustment relative thereto; a cam follower vertically slideable on said mast; means connecting said cam follower to said nozzle to accomplish the aforesaid adjustment of said nozzle by moving said cam follower up or down on said mast; a gear fixed on said mast; two concentric horizontally extending shafts mounted on said base; a rack provided on one of said shafts and adapted to be disposed in meshing relation with said gear and a cam fixed on the other of said shafts and adapted to engage with said cam follower, said shafts being operable from a remote control point to translate said rack and thereby rotate said mast or to rotate said cam and thereby effect an angular adjustment of said nozzle relative to said mast.

2. In combination: a base; a mast rotatable thereon in upright position; a nozzle mounted on said mast for angular adjustment relative thereto; a cam follower vertically slidable on said mast; means connecting said cam follower to said nozzle to accomplish the aforesaid adjustment of said nozzle by moving said cam follower up or down on said mast; a gear fixed on said mast; two concentric horizontally extending shafts mounted on said base; a rack provided on one of said shafts and adapted to be disposed in meshing relation with said gear; a cam fixed on the other of said shafts and adapted to engage with said cam follower, said shafts being operable from a remote control point to translate said rack and thereby rotate said mast or to rotate said cam and thereby effect an angular adjustment of said nozzle relative to said mast; and unitary means at said remote control point for selectively actuating said shafts.

CLIFFORD J. GRIFFITH.